(12) United States Patent
Kuronuma et al.

(10) Patent No.: US 6,859,848 B2
(45) Date of Patent: Feb. 22, 2005

(54) CIRCUIT FOR CONTROLLING SEQUENTIAL ACCESS TO SDRAM

(75) Inventors: Akira Kuronuma, Tokyo (JP); Souhei Tanaka, Kanagawa (JP); Masafumi Wataya, Kanagawa (JP); Toru Nakayama, Kanagawa (JP); Takuji Katsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/417,087

(22) Filed: Apr. 17, 2003

(65) Prior Publication Data

US 2003/0204651 A1 Oct. 30, 2003

(30) Foreign Application Priority Data

Apr. 25, 2002 (JP) ......................................... 2002-123811

(51) Int. Cl.[7] .............................................. G06F 13/28
(52) U.S. Cl. .............................. 710/22; 710/26; 710/35; 710/308; 711/105; 711/152
(58) Field of Search ............................ 710/22–28, 308, 710/35; 711/100–105, 147–153

(56) References Cited

U.S. PATENT DOCUMENTS 6,144,460 A     11/2000  Omo et al. ................. 358/1.16
6,366,989 B1 *  4/2002   Keskar et al. .............. 711/167
6,622,203 B2 *  9/2003   Simmons et al. ........... 711/105

FOREIGN PATENT DOCUMENTS

JP     2000/215155     8/2000

* cited by examiner

Primary Examiner—Kim Huynh
Assistant Examiner—Mike Nguyen
(74) Attorney, Agent, or Firm—Fitzpatrick, Cella, Harper & Scinto

(57) ABSTRACT

A DMA controller arbitrates and selects a DMA control information signal received from at least one of a plurality of DMA request blocks and accesses an SDRAM on the basis of the selected DMA control information signal. In the DMA controller, an SDRAM controller detects using a detector the number of possible sequential accesses on the basis of a DMA start address signal, compares using a comparator this number of possible sequential accesses with the burst DMA request number designated by a BSTNUM signal, selects not larger one of the two numbers, and sets the number of sequential DMAs to be actually executed to the selected number. Accordingly, with a simple configuration, sequential access is made possible starting from an arbitrary address.

5 Claims, 6 Drawing Sheets

Row : ROW ADDRESS
Col : COLUMN ADDRESS
BA : BANK ADDRESS

CIRCUIT FOR CONTROLLING SEQUENTIAL ACCESS TO SDRAM

BACKGROUND OF THE INVENTION

1. Field of the Invention

The present invention relates to circuits for controlling SDRAM (Synchronous Dynamic Random Access Memory) memories.

2. Related Background Art

SDRAM is a relatively new device created to enable an asynchronous DRAM (Dynamic Random Access Memory) to operate at a higher speed.

Although similar to a method for controlling known asynchronous DRAM, the SDRAM control method is characterized in that it uses a CLK signal for synchronization, it accesses the SDRAM using a command, it has sequential data read and write capability (burst mode), and so forth.

FIG. 4 is a timing chart showing standard access to an SDRAM that supports a burst length (BL) of 2.

In the actual method for accessing SDRAM, an SDRAM controller outputs an RAS address at the same time as issuing an ACTV command. Next, the SDRAM controller outputs a CAS address at the same time as issuing a WRITEA or READA command (hereinafter, unless otherwise stated, the next command can be accepted 1CLK after the ACTV command).

When the issued command is WRITEA, the SDRAM controller simultaneously outputs write data onto data bus lines and performs a write operation. When the issued command is READA, read data is output from the SDRAM after an intrinsic delay time (CAS latency=CL), and the SDRAM controller obtains the read data.

When the above-described WRITEA/READA commands are used, the burst number is a constant specified by the burst length (BL). In order to execute an arbitrary burst number, BL is changed by issuing a mode-register-set (MRS) command, and a combination of BLs is used to achieve the desired burst number. However, the total throughput is disadvantageously reduced. There is a method that does not use the above-described WRITEA/READA commands, and, instead, the burst operation is interrupted by the SDRAM controller when a desired burst number is reached.

FIG. 5 is a block diagram showing an example of the configuration of a general DMA (Direct Memory Access) controller. In general, DMA request blocks have different configurations depending on the application. On the other hand, memory controllers have different circuitry depending on the type of memory. It is thus preferable that an arbitration unit and a memory controller be independent of each other in order to facilitate accommodation of various applications and memories.

In this case, DMA request blocks 1-1 ... 1-N output to an arbiter circuit 3 signals including DMA request signals DREQ_1 ... N, address signals ADDRESS_1 ... N, DR-WX_1 ... N indicating whether a read or write request is issued, BSTNUM_1 ... N indicating the burst number, write data bus WRDATA_1 ... N, etc.

In contrast, the arbiter circuit 3 outputs to the DMA request block 1-1, ... 1-N negative logic DMA request acknowledgement signals REQACKX_1 ... N, read data bus RDDATA_1 ... N, and negative logic memory access signals DTACKX_1 ... N.

In this description, WRDATA and RDDATA are connected to all of the DMA request blocks 1-1 ... 1-N. In actual use, each DMA request block may only perform a read or a write. In such a case, the unused data bus need not be connected. In FIG. 5, a circuit for controlling refreshing the SDRAM is omitted.

At the same time, the arbiter circuit 3 outputs to an SDRAM controller 4 signals including an arbitrated DMA request signal REQ, arbitrated address signal ADRS, arbitrated read/write identifying signal R-WX, BSTNUM indicating the burst number, write data bus WRDATA, etc. In contrast, the SDRAM controller 4 outputs to the arbiter circuit 3 a read data bus RDDATA and negative logic memory access signal ORG_DTACKX. With the above-described arrangement, interfaces between the arbiter circuit 3 and the memory controller 4 are standardized to accommodate various applications and memories.

FIG. 6 is a timing chart showing the overall operation of the DMA controller for performing such a control operation. In this example, the burst length is set in advance to a maximum of 8 when an initial MRS command is issued.

In this example shown in the chart, the DMA request block 1-1 independently issues a burst read DMA request, and, during the DMA processing, the DMA request block 1-2 issues a burst write DMA request.

The detailed control flow will now be described.

At T0, the arbiter circuit 3 waits for a DMA request from each DMA request block in its arbitration operation enabled state.

At T1, the DMA request block 1-1 simultaneously outputs DMA control information and enables DREQ (where DREQ is a read for a burst of 2).

Having acknowledged the reception of DREQ during T2, the arbiter circuit 3 determines whether or not another DREQ is output. If another DREQ is output, the arbiter circuit 3 arbitrates between the DMA request blocks to select the DMA request block on the basis of a predetermined priority and latches DMA control information concerning the selected DMA request block.

At T3, DREQACKX is sent to the selected DMA request block (DMA request block 1-1).

At the same time, the latched DMA control information is output to the SDRAM controller 4, and REQ is enabled. The arbiter circuit 3 enters the DMA request acceptance, arbitration, and selection disabled state.

In response to REQ, at T4, the SDRAM controller 4 outputs a row address by issuing an ACTV command. At T5, the SDRAM controller 4 simultaneously issues a READ command and outputs a column address. In the case of READ, an SDRAM 5 outputs read data onto DQ after CL (in this example, CL=2), that is, subsequent to T7, and the SDRAM controller 4 obtains the read data. In this example, when no command is issued, the state is the NOP (No Operation) state. Alternatively, the SDRAM controller 4 may be in its standby mode in the DESL or PD state.

The obtained data is latched by the SDRAM controller 4 and then sent to each DMA request block 1. While the data is being accessed, ORG_DTACKX is enabled to enable each DMA request block 1 to read the data.

ORG_DTACKX is sent to the arbiter circuit 3, and the arbiter circuit 3 in turn outputs ORG_DTACKX to the selected DMA request block (DMA request block 1-1), that is, it enables only DTACKX_1 (low level).

When DTACKX_1 is enabled, the DMA request block 1-1 reads the data at the time indicated by DTACKX_1 from RDDATA_1.

In contrast, the SDRAM controller 4 requests data access a desired number of times (twice) and then terminates the burst operation at T7 by issuing a PRE command.

When data is read the desired number of times (twice), the SDRAM controller 4 disables ORG_DTACKX signal (high level) at T9.

When the arbiter circuit 3 detects the rising of ORG_DTACKX signal at T10, the arbiter circuit 3 cancels the DMA request acceptance, arbitration, and selection disabled state at T11.

As a result, at T12, DREQ2 from the DMA request block 1-2 is acknowledged. It is then determined whether or not another DREQ is output. If another DREQ is output, arbitration and selection is performed on the basis of the predetermined priority.

In this example, since only the request from the DMA request block 1-2 has been output, DMA control information from the DMA request block 1-2 is latched.

At T13, DREQACKX is sent to the selected DMA request block (DMA request block 1-2).

At the same time, the latched DMA control information is output to the SDRAM controller 4, and REQ is enabled. The arbiter circuit 3 again enters the DMA request acceptance, arbitration, and selection disabled state.

In response to REQ, at T14, the SDRAM controller 4 outputs a row address by issuing an ACTV command. At T15, the SDRAM controller 4 simultaneously issues a WRIT command and outputs a column address.

In the case of WRIT, the DMA request block 1-2 outputs data to WRDATA_2 bus at the same time as issuing the WRIT command.

The data is output via the SDRAM controller 4 to DQ and actually written in the memory. While the data is being written in the memory, ORG_DTACKX is enabled.

ORG_DTACKX is sent to the arbiter circuit 3, and the arbiter circuit 3 in turn outputs ORG_DTACKX to the selected DMA request block (DMA request block 1-2), that is, it only enables DTACKX_2.

In this example, a burst write of three writes is instructed. After data is written three times, at T18, a PRE command is issued to interrupt the burst write, and ORG_DTACKX is disabled.

When the arbiter circuit 3 detects the rising of ORG_DTACKX signal at T18, the arbiter circuit 3 cancels the DMA request acceptance, arbitration, and selection disabled state at T19.

According to the known control method, the maximum number of sequential accesses to SDRAM is limited by the SDRAM settings. In general SDRAMs, the maximum number is 256, 8, 4, or 2.

There is a special relationship between the burst length and address. In the case of gaining the burst access to the SDRAM, the address is updated by a counter in the SDRAM. Since incrementing the address does not generate a carry into the next higher order even when a preset burst length is exceeded, different addresses are accessed when sequential accesses are tried starting from an arbitrary address. For example, when the burst length is set to 8, accessing the lower-order addresses 0Ch to 14H in five bursts actually results in accessing 0Ch, 0Eh, 00, 02, and 04.

In electronic apparatuses such as printers, the maximum number of sequential DMA requests ranges from approximately 10 to 100. Since the capacity of the built-in memory is not high, a system for accessing a column address at a boundary is difficult to configure.

In order to solve these problems, Japanese Patent Laid-Open No. 2000-215155 describes a controller that performs single transfer to the boundary and then performs burst transfer. Such a controller disadvantageously has a complicated circuit.

The number of DMA request blocks is approximately ten. When one DMA request block continuously accesses the SDRAM for a long period of time, the other DMA request blocks cannot perform the processing. As a result, the printer has a reduced throughput.

In these electronic apparatuses, a clock frequency supplied to the SDRAM is much smaller than the maximum clock frequency that can be received by the SDRAM. Therefore, when one DMA request block sequentially accesses the SDRAM for a long period of time, the memory is not refreshed properly.

Accordingly, a need arises for these electronic apparatuses to implement a memory control system that can start sequential access exceeding eight bursts at an arbitrary address using a relatively simple configuration.

SUMMARY OF THE INVENTION

It is an object of the present invention to provide a memory control system for sequentially accessing an arbitrary address using a relatively simple circuit in a system that uses an SDRAM and that operates at a clock slower than the SDRAM's standard operating clock.

According to one aspect, the present invention which achieves these objectives relates to a memory control circuit for arbitrating and selecting a DMA control information signal received from at least one of a plurality of DMA request blocks and accessing an SDRAM on the basis of the selected DMA control information signal. The DMA control information signal includes a DMA request signal, a data access signal, an address signal, and a designation signal that designates the burst DMA request number. The memory control circuit includes a detector that detects the number of possible sequential accesses (hereinafter referred to as the sequential access number) on the basis of the address signal; a selector that selects not larger one from among the burst DMA request number designated by the designation signal and the sequential access number detected by the detector; and a setting unit that sets the number of sequential DMAs to be actually performed to the number selected by the selector.

Other objectives and advantages besides those discussed above shall be appearing to those skilled in the art from the description of a preferred embodiment of the invention which follows. In the description, reference is made to accompanying drawings, which form a part thereof, and which illustrate an example of the invention. Such an example, however, is not exhaustive of the various embodiments of the invention, and therefore reference is made to the claims which follow the description for determining the scope of the invention.

DESCRIPTION OF THE PREFERRED EMBODIMENTS

With reference to the accompanying drawings, preferred embodiments of the present invention will now be described in detail.

First Embodiment

With reference to the drawings, a first embodiment of the present invention will now be described in detail.

Figure 5:
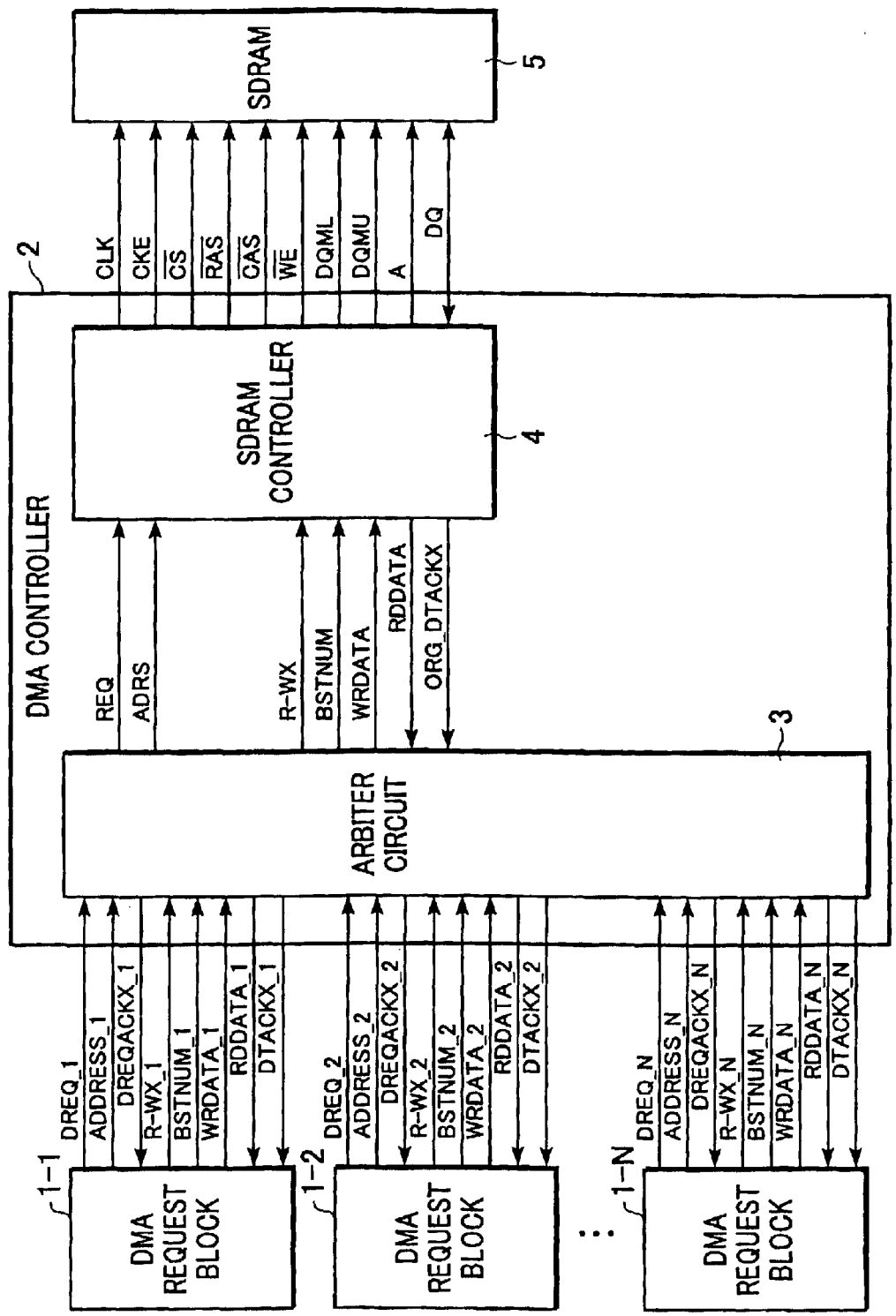
FIG. 5 is a block diagram showing an example of the configuration of a general DMA controller.
Figure 6:
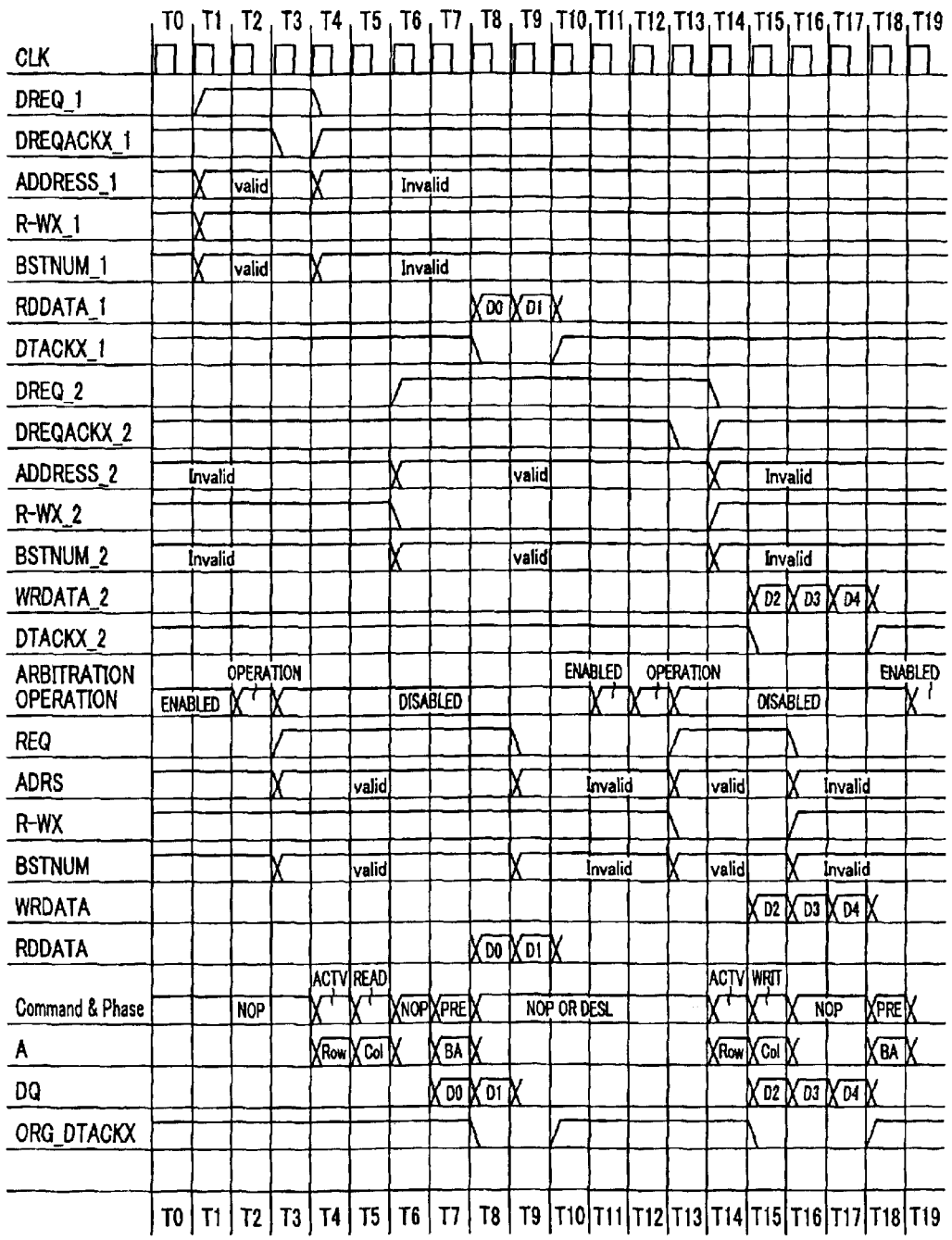
FIG. 6 is a timing chart showing the overall operation of a known DMA controller.

The overall configuration of a DMA controller according to the first embodiment is equivalent to that of the general DMA controller shown in FIG. 5 used to describe the related background art. The first embodiment is characterized by components in the SDRAM controller 4.

Figure 1:
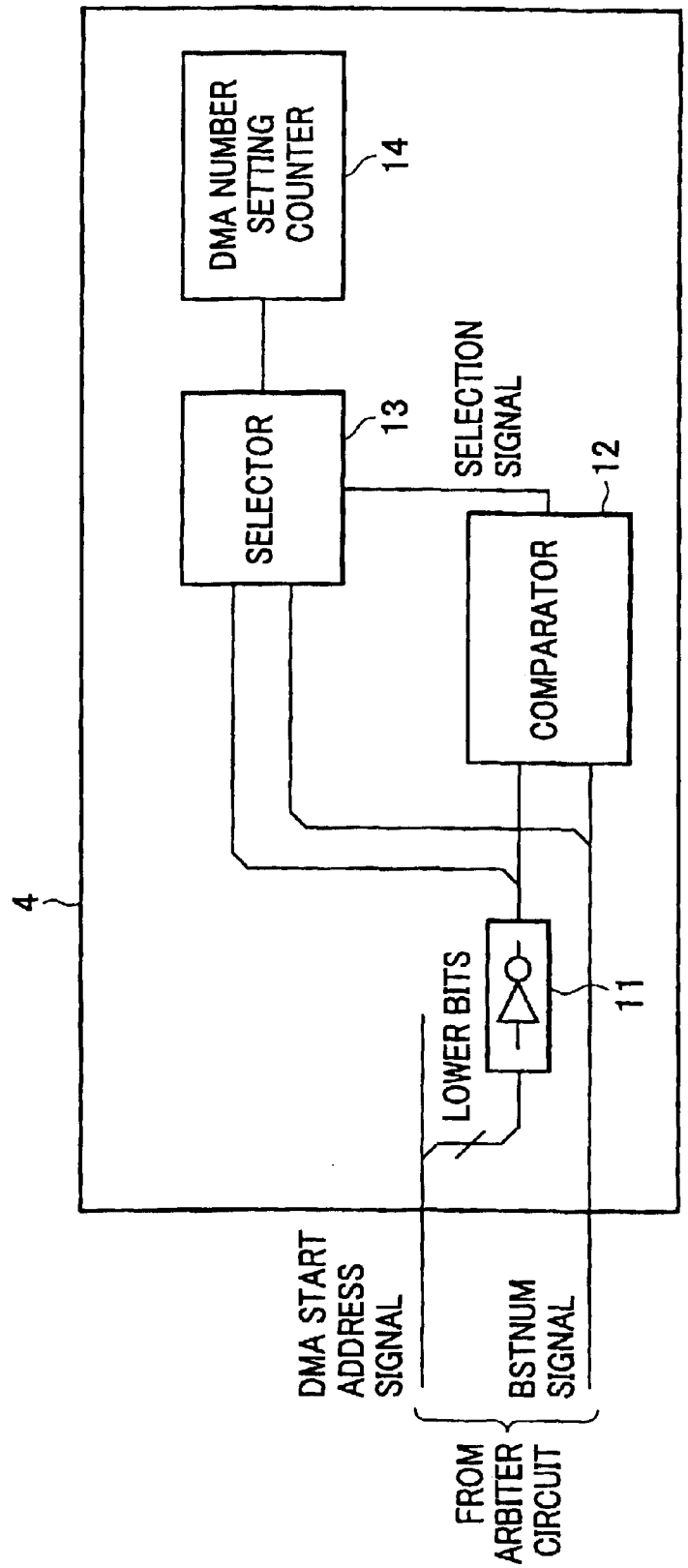
FIG. 1 is a block diagram of a DMA execution number determining circuit in an SDRAM controller according to an embodiment of the present invention.

FIG. 1 is a block diagram of a DMA execution number determining circuit in the SDRAM controller 4 according to the first embodiment.

Figure 2:
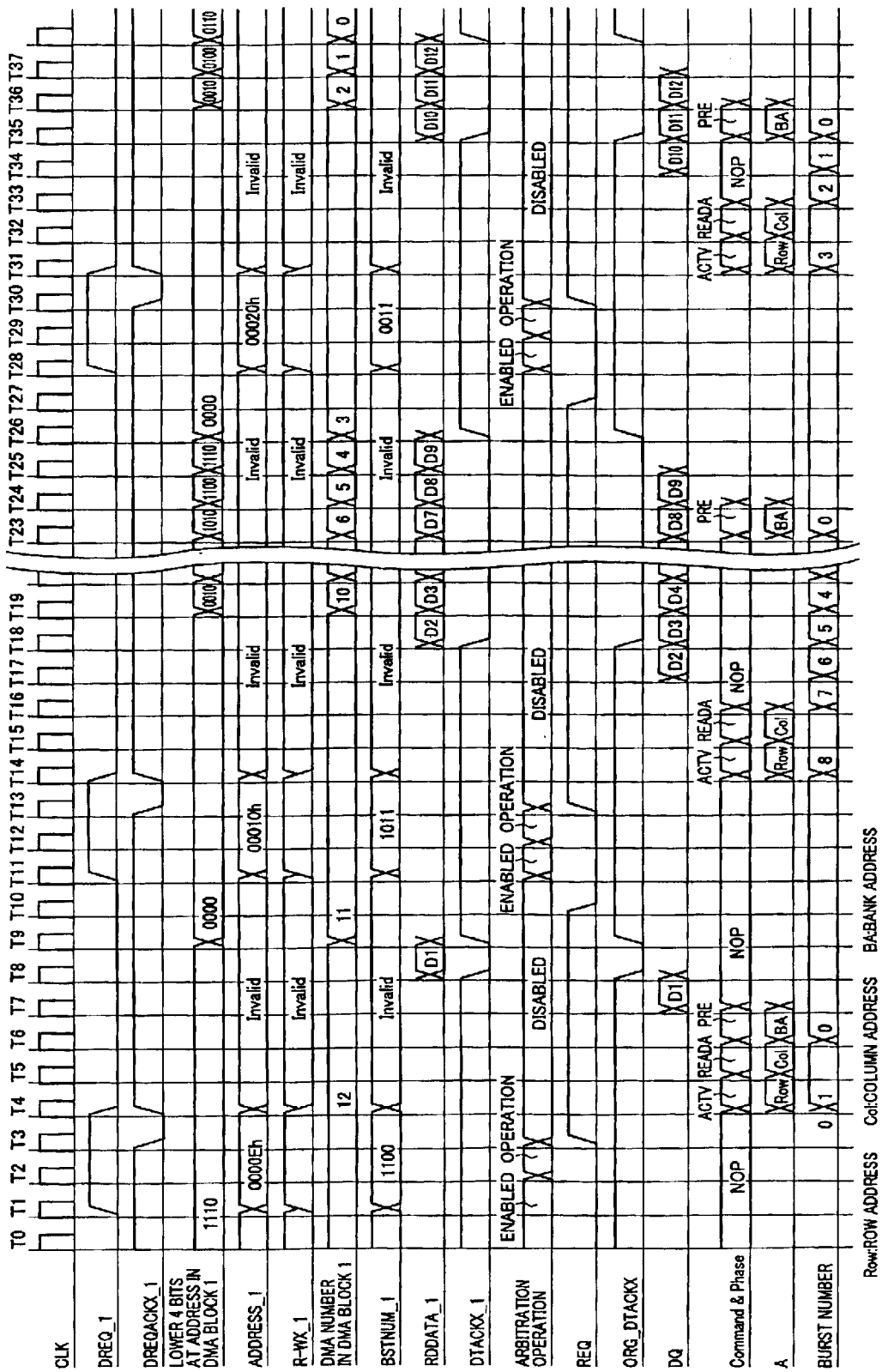
FIG. 2 is a timing chart for describing a first embodiment of the present invention.

FIG. 2 is a timing chart showing the overall operation of the SDRAM controller 4 that performs such control. In this example, the burst length is set in advance to a maximum of 8 when an initial MRS command is issued.

The maximum number of sequential DMA requests of the DMA request block 1-1 is set to 25, and hence the bus width of BSTNUM_1 is 5.

The flow of processing described here involves a case in which the DMA request block 1-1 issues a DMA request for 12 burst reads starting from address 0000Eh.

At T0, the arbiter circuit 3 waits for a DMA request from each DMA request block in its arbitration operation enabled state.

At T1, the DMA request block 1-1 simultaneously outputs DMA control information and enables a DMA request signal (DREQ_1).

Having acknowledged the reception of DREQ_1 during T2, the arbiter circuit 3 determines whether or not another DREQ is output. If another DREQ is output, the arbiter circuit 3 performs arbitration and selection on the basis of a predetermined priority and latches the DMA control information concerning the selected DMA request block 1-1.

At T3, DREQACKX is sent to the selected DMA request block (DMA request block 1-1).

At the same time, the latched DMA control information is output to the SDRAM controller 4, and REQ is enabled. The arbiter circuit 3 enters the DMA request acceptance, arbitration, and selection disabled state.

In response to REQ, at T4, the SDRAM controller 4 outputs a row address by issuing an ACTV command.

A detector 11 detects the sequential access number=1 from the lower-order three bits at address [3:1]. The sequential access number is computed by, for example, inverting the three bits at address [3:1] and adding one. A comparator 12 compares the detected sequential access number=1 with BSTNUM=12. Since the sequential access number=1 is less than BSTNUM=12, a selector 13 selects the sequential access number=1 on the basis of a selection signal based on the comparison result. The selected number is set to the actual burst access number in a DMA number setting counter 14. (In the first embodiment, address 0 is used when byte access is performed. In order to simplify the description, the access width is 16 bits.)

At T5, the SDRAM controller 4 simultaneously issues a READ command and outputs a column address. In the case of READ, the SDRAM 5 outputs read data after CL (in this example, CL=2), that is, subsequent to T7, and the SDRAM controller 4 obtains the read data.

The obtained data is latched by the SDRAM controller 4 and then sent to each DMA request block 1. While the data is being accessed, ORG_DTACKX is enabled to enable each DMA request block 1 to read the data.

ORG_DTACKX is sent to the arbiter circuit 3, and the arbiter circuit 3 in turn outputs ORG_DTACKX to the selected DMA request block (DMA request block 1-1), that is, it enables only DTACKX_1 (low level).

When DTACKX_1 is enabled, the DMA request block 1-1 reads the data at the time indicated by DTACKX_1 from RDDATA_1. In FIG. 2, the DMA request block 1-1 reads data D1 at the rising of CLK at T9.

In contrast, the SDRAM controller 4 requests data access a desired number of times (once) set in the DMA number setting counter 14 and then terminates the burst operation at T6 by issuing a PRE command.

At T9, the ORG_DTACKX signal is disabled (high level).

When the arbiter circuit 3 detects at T10 that the ORG_DTACKX signal is disabled, the arbiter circuit 3 cancels the DMA request acceptance, arbitration, and selection disabled state at T11. (Since the operation of the arbiter circuit 3 from this point onward is not directly related to the first embodiment of the present invention, a description thereof is omitted.)

At the same time, the DMA request block 1-1 increments the address maintained therein and decrements the DMA number maintained therein during a period in which DTACKX_1 is enabled. As a result, when DTACKX_1 becomes invalid, the address becomes 00010h, and the DMA number becomes 11.

Since the DMA number is not zero, the DMA request block 1-1 again outputs a DMA request at T11. In this case, DMA control information indicates that the address is 00010h and the DMA number is 11.

The SDRAM controller 4 that has again received the DMA request computes, using the detector 11, the sequential access number=8 from the newly received address 00010h. The comparator 12 compares the sequential access number=8 with the DMA request number=11. The selector 13 selects the sequential access number=8. The actual burst access number in the DMA number setting counter 14 is set to the selected number, and a read DMA is performed. In this case, ORG_DTACKX is enabled for a duration of 8 clocks. As a result, DTACKX_1 is enabled for 8 clocks.

As in the previous processing, the DMA request block 1-1 increments the address by 8 and decrements the DMA number by 8.

As a result, the address becomes 00020h, and the DMA number becomes 3. Since the DMA number is not zero, the DMA request block 1-1 again outputs a DMA request at T28.

The SDRAM controller 4 that has again received the DMA request computes the sequential access number=8 from the newly received address. The sequential access number=8 is compared with the DMA request number=3. Since this time the DMA request number is less than the sequential access number, the DMA request number is selected. The actual burst access number is set to 3, and access is thus made. In this case, ORG_DTACKX is enabled for a duration of 3 clocks. Similarly, DTACKX_1 is enabled for 3 clocks.

As in the previous processing, the DMA request block 1-1 increments the address by 3 and decrements the DMA number by 3.

As a result, the address becomes 00026h, and the DMA number becomes 0. Since the DMA number becomes zero, the DMA request block 1-1 terminates the DMA processing.

As described above, twelve sequential accesses are performed in three divided actions. During a period in which the twelve sequential accesses are performed in three divided actions, when a DMA request is issued by another DMA request block 1 or when a refresh request is issued, the processing is interrupted.

Second Embodiment

In the first embodiment, the BSTNUM signal is determined by the maximum number of sequential DMA requests from each DMA request block. In contrast, the size of the comparator 12 is determined by the largest maximum number of sequential DMA requests from a plurality of DMA request blocks. Even if only one DMA request block issues a large number of sequential DMA requests, the comparator 12 still needs to be sized in accordance with this DMA request number. Accordingly, the circuit may become redundant.

Figure 3:
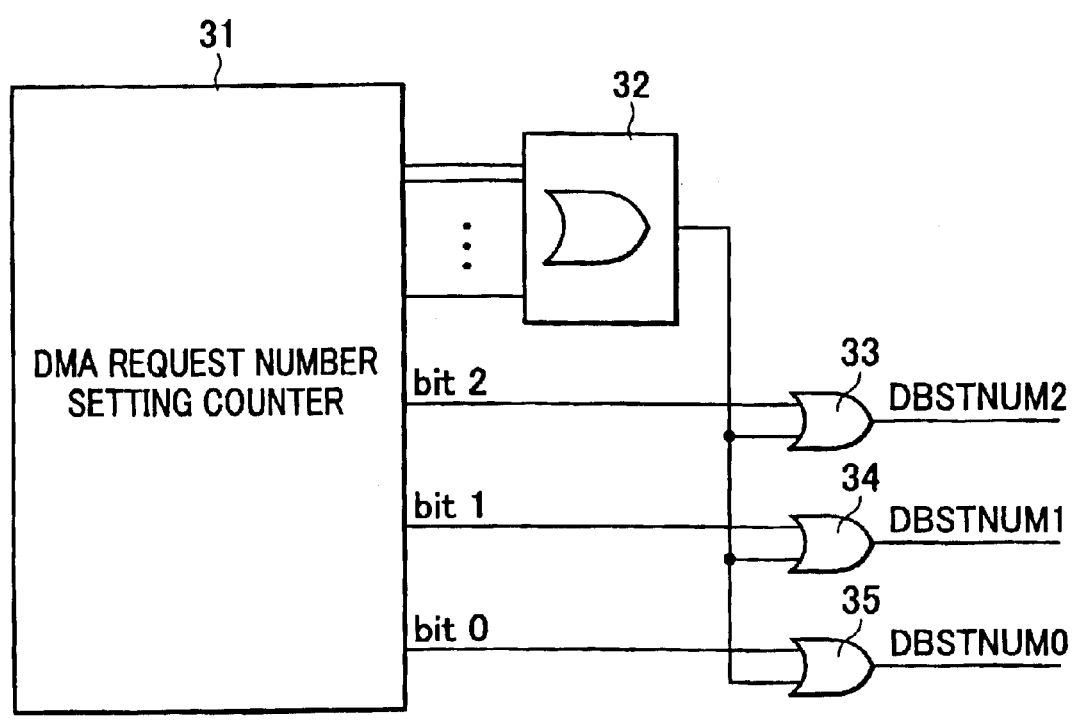
FIG. 3 is a diagram of a BSTNUM signal generating circuit in a DMA request block according to a second embodiment of the present invention.
Figure 4:
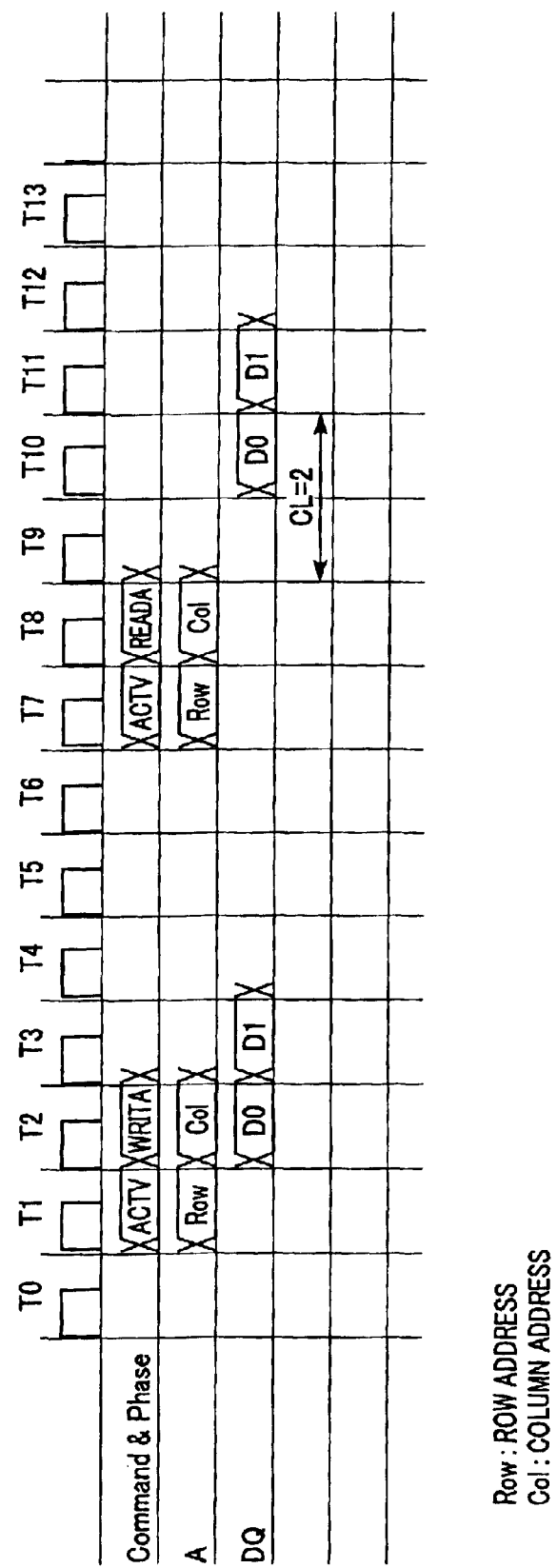
FIG. 4 is a timing chart showing standard access to SDRAM.

In the second embodiment, in each DMA request block 1, a circuit that generates a DBSTNUM signal on the basis of the DMA request number is configured as shown in FIG. 3 in order that the size of the comparator 12 be in accordance with the maximum DMA number that can be executed by the SDRAM controller 4.

FIG. 3 illustrates a case in which the maximum DMA number executable by the SDRAM controller 4 is eight (which is preset by an MRS command).

In this case, the DBSTNUM signal bus width only needs to be three (DBSTNUM signal+1=actual DMA request number; thus, DMA is performed once in the case of "000" and eight in the case of "111").

The lower-order three bits of the a DMA request number setting counter 31 are input to an OR gate 32, and the output of the OR gate 32 is separately ORed with the lower-order three bits by OR gates 33 to 35.

With this circuit configuration, if the burst request number set in the DMA request number setting counter 31 is eight or greater, the output of the OR gate 32 is one, and the outputs of the OR gates 33 to 35 are all one. Thus, the DBSTNUM signal (DBSTNUMs 1 to 3) is always "111".

By combining each DMA request block 1 having this configuration with the SDRAM controller 4 shown in the first embodiment, the operation is the same as that in the first embodiment, whereas the comparator 3 in the SDRAM controller 4 only needs to compare three bits, reducing redundancy of the circuit.

The bus width between each DMA request block 1 and the DMA controller 2 can be minimum. When the circuit is configured using an integrated circuit such as an ASIC (Application Specific Integrated Circuit), the area of a wiring portion is reduced.

According to the embodiments described above, the requested DMA number is compared with the number of sequential possible accesses starting from a given DMA start address, thus determining the actual DMA number to be executed. With a relatively simple configuration, sequential DMAs exceeding the number of sequential DMAs that can be actually executed by the SDRAM controller can be performed.

In this case, the SDRAM controller does not actually perform sequential DMAs exceeding the number of sequential DMAs that can be executed by the SDRAM controller. One DMA request block does not occupy the bus for a long period of time. Even in an electronic apparatus that uses a relatively low-speed clock, other control operations such as refreshing are not hindered.

Since one burst DMA is always performed in the same column, complicated control need not be performed in order to perform DMAs covering a plurality of columns. The circuit it thus simplified.

Although the present invention has been described in its preferred form with a certain degree of particularity, many apparently widely different embodiments of the invention can be made without departing from the spirit and the scope thereof. It is to be understood that the invention is not limited to the specific embodiment thereof except as defined in the appended claims.

What is claimed is:

1. A memory control circuit for arbitrating and selecting a direct memory access (DMA) control information signal received from at least one of a plurality of DMA request blocks and accessing a synchronous dynamic random access memory (SDRAM) on the basis of the selected DMA control information signal, the DMA control information signal including a DMA request signal, a data access signal, an address signal, and a designation signal that designates a burst DMA request number, said memory control circuit comprising:

detecting means for detecting a number of possible sequential accesses on the basis of the address signal;

comparison means for comparing the burst DMA request number with the number of possible sequential accesses;

selecting means for selecting the lesser of the burst DMA request number and the number of possible sequential accesses, based on the result of the comparison made by said comparison means; and setting means for setting the number of sequential DMAs to be executed to the number selected by said selecting means.

2. A DMA request block connectable to a memory control circuit, the DMA request block comprising:

incrementing means for incrementing a memory address signal that designates an access destination on the basis of a data access signal;

decrementing means for decrementing a burst DMA request number designated by the designation signal on the basis of the data access signal;

determining means for determining, at the time one burst DMA control is completed by the data access signal, whether or not the decremented burst DMA request number is zero; and request control means for making a DMA request on the basis of the incremented memory address signal and the decremented burst DMA request number when it is determined by said determining means that the decremented burst DMA request number is not zero, wherein the memory control circuit arbitrates and selects a direct memory access (DMA) control information signal received from the DMA request block as one of a plurality of DMA request blocks and accesses a synchronous dynamic random access memory (SDRAM) on the basis of the selected DMA control information signal, the DMA control information signal including a DMA request signal, the data access signal, an address signal, and a designation signal that designates the burst DMA request number, the memory control circuit comprising:

detecting means for detecting a number of possible sequential accesses on the basis of a received address signal;

comparison means for comparing a received burst DMA request number with the number of possible sequential accesses;

selecting means for selecting the lesser of the received burst DMA request number and the number of possible sequential accesses, based on the result of the comparison made by said comparison means; and setting means for setting the number of sequential DMAs to be executed to the number selected by said selecting means.

3. A DMA request block according to claim 2, wherein, when making the DMA request, on condition that the burst DMA request number is greater than the maximum number of possible sequential accesses, the value of the designation signal that designates the burst DMA request number is set to the maximum number.

4. A DMA request block according to claim 3, wherein the width of a signal line for the designation signal that designates the burst DMA request number is designed on the basis of the maximum number of possible sequential accesses.

5. A memory access system comprising:

a memory control circuit for arbitrating and selecting a direct memory access (DMA) control information signal received from at least one of a plurality of DMA request blocks and accessing a synchronous dynamic random access memory (SDRAM) on the basis of the selected DMA control information signal, the DMA control information signal including a DMA request signal, a data access signal, an address signal, and a designation signal that designates a burst DMA request number, said memory control circuit comprising:

detecting means for detecting a number of possible sequential accesses on the basis of the address signal;

comparison means for comparing the burst DMA request number with the number of possible sequential accesses;

selecting means for selecting the lesser of the burst DMA request number, and the number of possible sequential accesses, based on the result of the comparison made by said comparison means; and setting means for setting the number of sequential DMAs to be executed to the number selected by said selecting means; and a plurality of DMA request blocks connectable to said memory control circuit, wherein each of said plurality of DMA request blocks comprise:

incrementing means for incrementing a memory address signal that designates an access destination on the basis of the data access signal;

decrementing means for decrementing the burst DMA request number designated by the designation signal on the basis of the data access signal;

determining means for determining, at the time one burst DMA control is completed by the data access signal, whether or not the decremented burst DMA request number is zero; and request control means for again making a DMA request on the basis of the incremented memory address signal and the decremented burst DMA request number when it is determined by said determining means that the decremented burst DMA request number is not zero.

* * * * *